United States Patent
Chen et al.

(10) Patent No.: US 9,652,000 B1
(45) Date of Patent: May 16, 2017

(54) CONVERTER

(71) Applicant: Super Micro Computer Inc., San Jose, CA (US)

(72) Inventors: Richard S. Chen, San Jose, CA (US); Lawrence H. Liang, San Jose, CA (US); Pae Yoong Ng, San Jose, CA (US); Hsin-Yun Shih, San Jose, CA (US)

(73) Assignee: SUPER MICRO COMPUTER INC., San Jose, CA (US)

( * ) Notice: Subject to any disclaimer, the term of this patent is extended or adjusted under 35 U.S.C. 154(b) by 0 days.

(21) Appl. No.: 14/932,969

(22) Filed: Nov. 5, 2015

(51) Int. Cl.
*G06F 1/18* (2006.01)

(52) U.S. Cl.
CPC ................................. *G06F 1/183* (2013.01)

(58) Field of Classification Search
CPC .... G06F 1/183; H05K 7/1422; H05K 7/1424; H05K 7/1427
See application file for complete search history.

(56) References Cited

U.S. PATENT DOCUMENTS

| | | | | |
|---|---|---|---|---|
| 6,219,252 B1* | 4/2001 | Tsai | ...................... | G06F 1/1632 174/359 |
| 6,430,644 B1* | 8/2002 | Luen | ...................... | G06F 1/181 361/726 |
| 7,567,434 B1* | 7/2009 | Sivertsen | .................. | G06F 1/18 361/679.32 |
| 7,596,001 B2* | 9/2009 | Tang | ...................... | G06F 1/186 312/223.2 |
| 8,693,208 B2* | 4/2014 | Reinke | .................... | G06F 1/185 361/679.4 |
| 2006/0039120 A1* | 2/2006 | Young | ...................... | G06F 1/20 361/719 |
| 2010/0005211 A1* | 1/2010 | Wen | ...................... | H05K 7/1429 710/302 |
| 2011/0128710 A1* | 6/2011 | Kuo | ........................ | G06F 1/186 361/759 |
| 2012/0328363 A1* | 12/2012 | Lin | .......................... | G06F 1/186 403/315 |
| 2013/0135826 A1* | 5/2013 | Liu | ........................ | G06F 1/185 361/740 |
| 2013/0223027 A1* | 8/2013 | Hashimoto | ............ | H05K 1/117 361/756 |
| 2013/0260591 A1* | 10/2013 | Lai | ..................... | H01R 13/6271 439/328 |

(Continued)

*Primary Examiner* — Hoa C Nguyen
*Assistant Examiner* — Keith Depew
(74) *Attorney, Agent, or Firm* — Chun-Ming Shih; HDLS IPR SERVICES

(57) ABSTRACT

A converter includes a connecting block and multiple conversion modules corresponsive to each positioning slot. The connecting block has multiple positioning slots. Each conversion module includes a printed circuit board, and a positioning notched edge formed at an edge of the printed circuit board, and at least a portion of each printed circuit board is accommodated into the corresponsive positioning slot, and each positioning notched edge is latched and coupled to an edge of the corresponsive positioning slot, and each printed circuit board has a first connector and a second connector electrically connected to the first connector, and both of the first connector and the second connector are configured on both sides of the connecting block respectively.

9 Claims, 9 Drawing Sheets

(56) References Cited

U.S. PATENT DOCUMENTS

| | | | | |
|---|---|---|---|---|
| 2013/0342983 | A1* | 12/2013 | Wang | G06F 1/181 |
| | | | | 361/679.02 |
| 2015/0009617 | A1* | 1/2015 | Yin | G06F 1/186 |
| | | | | 361/679.32 |
| 2015/0318627 | A1* | 11/2015 | Berry, Jr. | H01R 12/7076 |
| | | | | 714/6.32 |

* cited by examiner

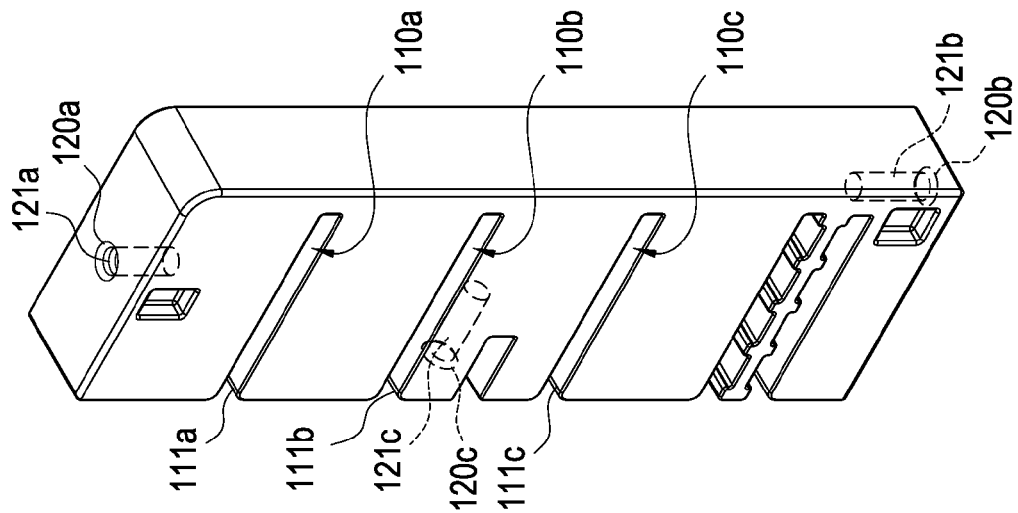
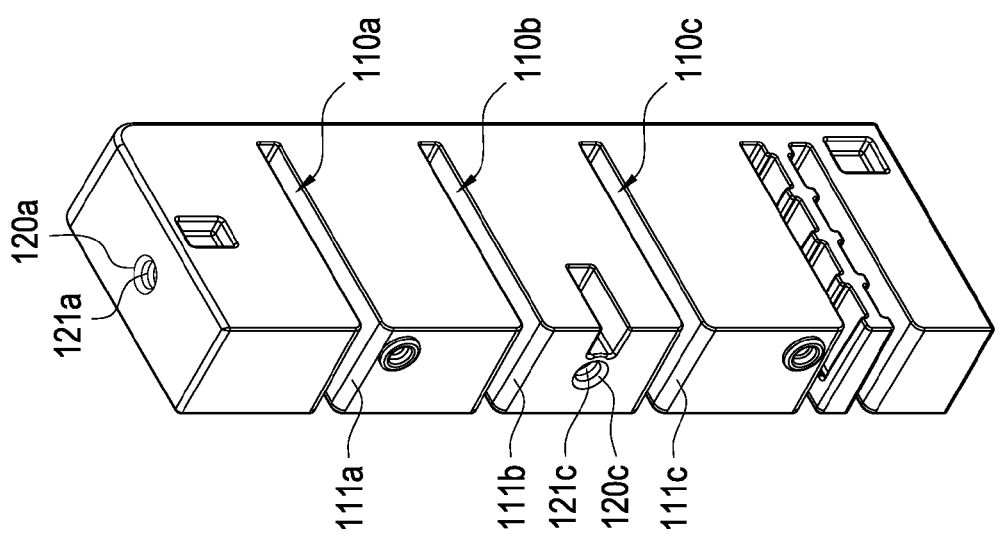

CONVERTER

TECHNICAL FIELD

The technical field relates to a signal converter, more particularly to a converter including a plurality of conversion module.

BACKGROUND

A Serial Attached Small Computer System Interface (SAS) connector is a common connector used for transmitting data of a hard disk, and a SAS converter generally includes a printed circuit board and one or more pairs of SAS connectors installed on the printed circuit board, and the pairs of SAS connectors are electrically coupled to the printed circuit board. The printed circuit board is locked to a carrier board, and the carrier plate is locked into a PCI expansion slot of a computer chassis, and one of the SAS connectors is exposed from the PCI expansion slot, and the other SAS connector is contained in the chassis and provided for connecting a hard disk, wherein the SAS converter serves as an external data transmission channel of the hard disk.

Present SAS converters may includes a plurality of printed circuit boards locked on the carrier board as needed and provided for the use by a plurality of hard disks. However, it is necessary to extend an area from each printed circuit board to form a lock hole in order to lock the carrier board, and thus increasing the total volume of the converters.

In view of the aforementioned issue, the discloser of this disclosure based on years of experience in the industry to conduct extensive researches and experiments and finally provided a feasible solution to overcome the problem of the prior art effectively.

SUMMARY

It is a primary objective of this disclosure to provide a converter including a plurality of conversion modules.

To achieve the aforementioned and other objectives, this disclosure provides a converter, comprising a connecting block and plurality of conversion modules corresponsive to each positioning slot. The connecting block has a plurality of positioning slots. Each conversion module includes a printed circuit board and a positioning notched edge formed at an edge of each printed circuit board, and at least a portion of each printed circuit board is contained in the corresponsive positioning slot, and each positioning notched edge is latched to an edge of the corresponsive positioning slot, and each printed circuit board includes a first connector and a second connector electrically coupled to the first connector, and both first and second connectors are configured on both sides of the connecting block respectively.

Preferably, the converter further comprises a carrier plate, and each positioning slot has an opening, and each printed circuit board is installed into the corresponsive positioning slot through the opening, and the connecting block is locked to the carrier plate, and the carrier plate covers each opening, so that the printed circuit boards are clamped between the connecting block and the carrier plate.

Preferably, the carrier plate has a mounting structure, and the mounting structure includes a locking notched edge formed at an edge of the carrier plate edge, and the mounting structure may include a latched formed at an edge of the carrier plate edge.

Preferably, the connecting block has a locking hole, and the carrier plate has a through hole corresponsive to the locking hole, and the locking hole has a thread formed therein.

Preferably, the connecting block is locked to the carrier plate, and the carrier plate has a mounting structure, and the mounting structure includes a port corresponsive to the first connector, and the first connector is passed and installed into the port. The positioning notched edge is disposed between the first connector and the second connector.

Preferably, the printed circuit boards are installed on the same plane or arranged parallel to each other and stacked with an interval apart with each other.

The converter of this disclosure comes with a connecting block for connecting a plurality of conversion modules, so that each conversion module does not require the installation of an additional connecting mechanism, and the total volume of the converter can be reduced.

BRIEF DESCRIPTION OF THE DRAWINGS

FIGS. 7a and 7b are perspective views of a conversion module of the second preferred embodiment of this disclosure;

DESCRIPTION OF THE PREFERRED EMBODIMENTS

The technical contents of this disclosure will become apparent with the detailed description of preferred embodiments accompanied with the illustration of related drawings as follows. It is intended that the embodiments and figures disclosed herein are to be considered illustrative rather than restrictive.

Figure 1:
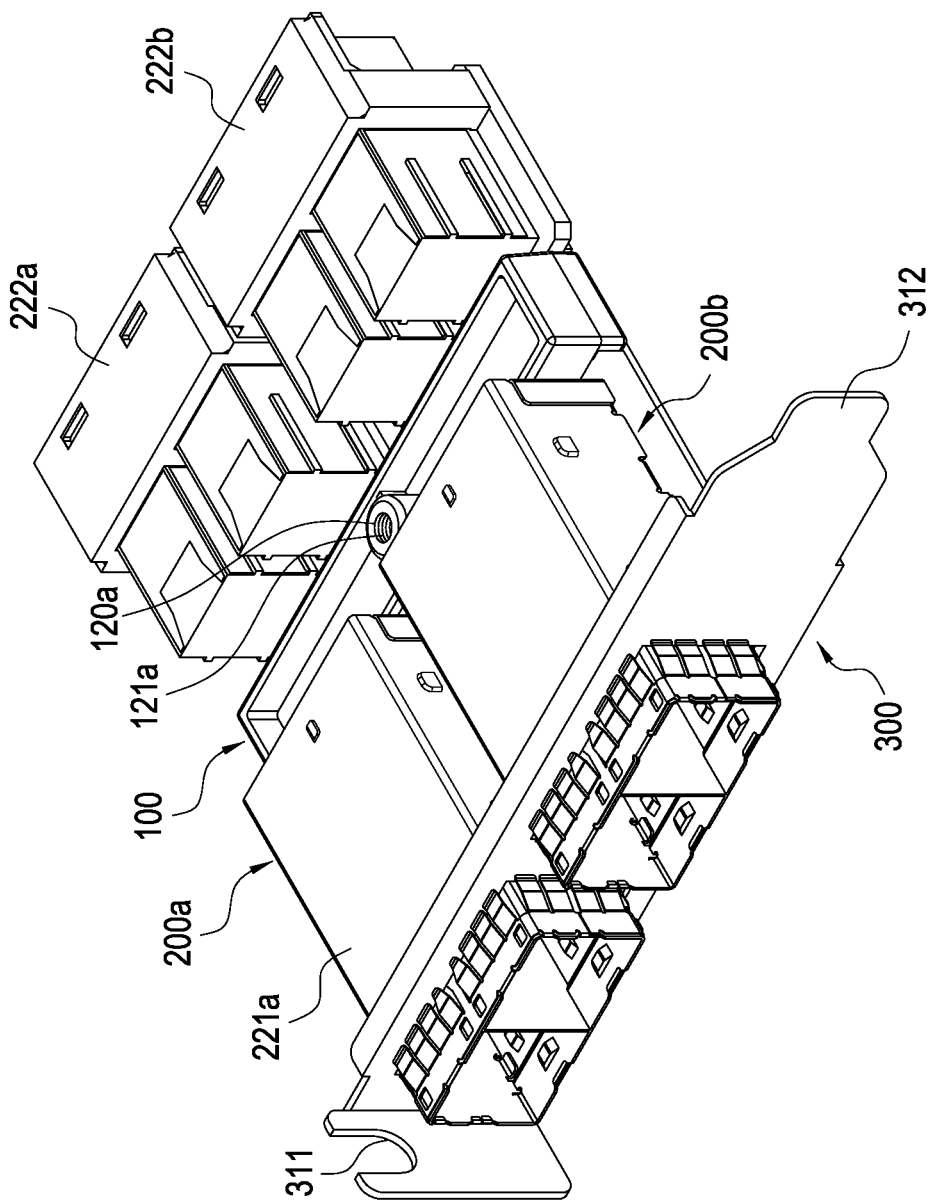
FIG. 1 is a perspective view of a converter of a first preferred embodiment of this disclosure.
Figure 2:
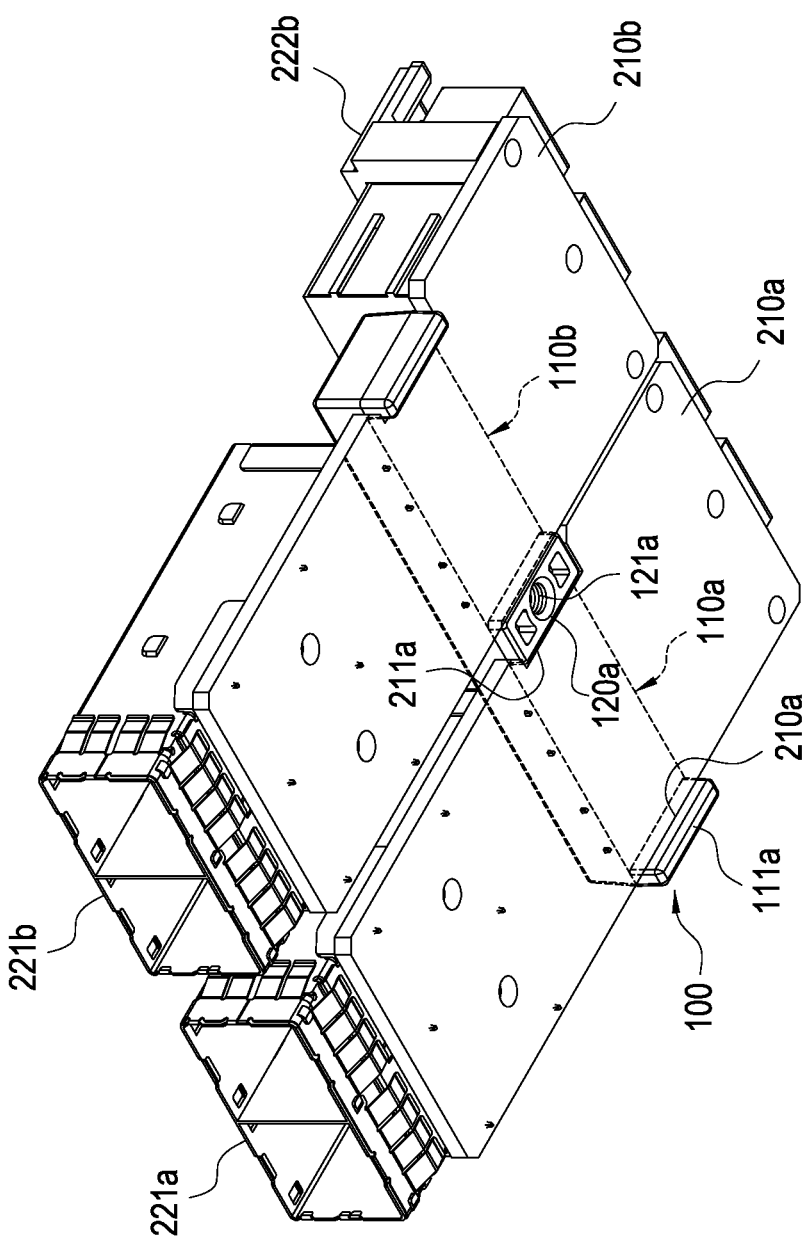
FIG. 2 is another perspective view of a converter of the first preferred embodiment of this disclosure.

With reference to FIGS. 1 and 2 for a converter of the first preferred embodiment of this disclosure, the converter comprises a connecting block 100, a plurality of conversion modules 200a/b, and a carrier plate 300.

Figure 3:
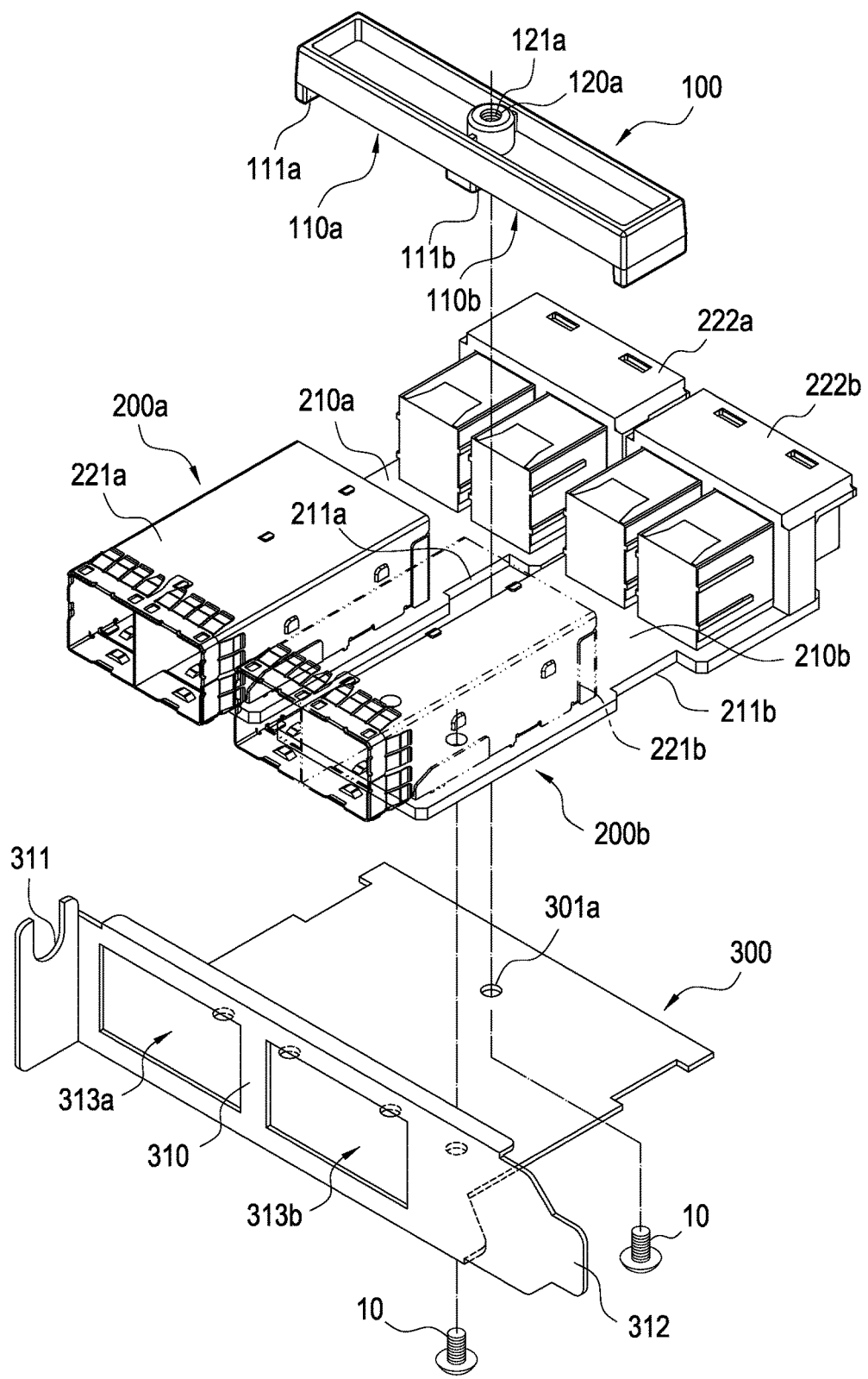
FIG. 3 is an exploded view of a converter of the first preferred embodiment of this disclosure.

In this preferred embodiment as shown in FIG. 3, the connecting block 100 is preferably a rectangular insulating block and has a plurality of positioning slots 110a/b formed on a side of the connecting block 100. In this preferred embodiment, the connecting block 100 has two positioning slots 110a/b, and a locking hole 120a/b. Each positioning slot 110a/b preferably has a rectangular opening 111a/b and the opening 111a/b is configured along the longitudinal direction of the connecting block 100. The locking hole 120a is preferably disposed between the two positioning slots 110a/b, but the position of the locking hole 120a is not limited in this disclosure, and the inner wall of locking hole 120a may come with a thread 121a.

Figure 4B:
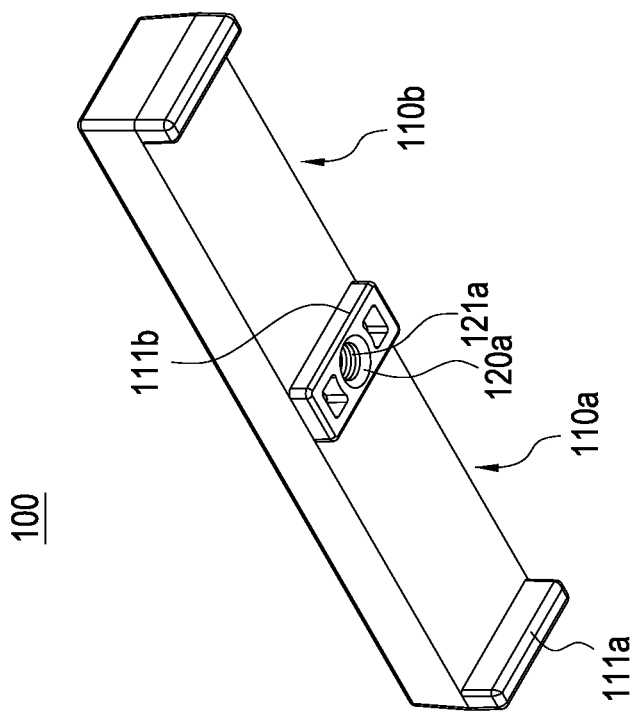
FIGS. 4a and 4b are perspective views of a conversion module of the first preferred embodiment of this disclosure.
Figure 4A:
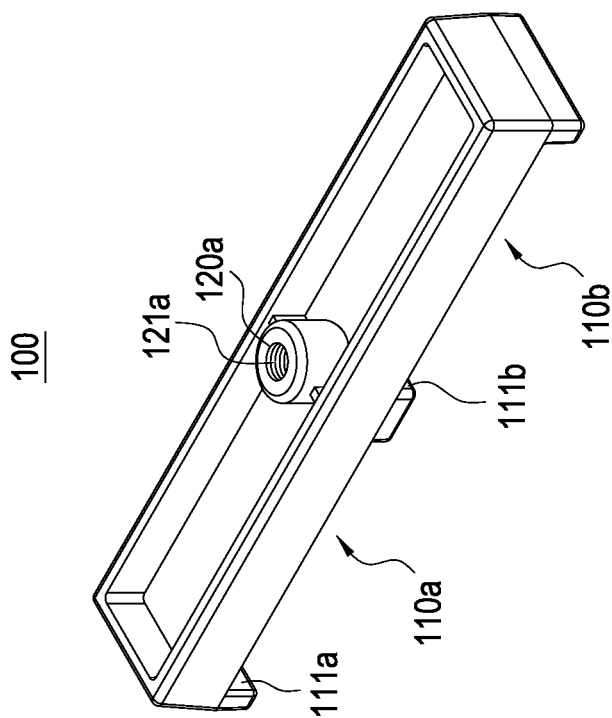

With reference to FIGS. 4a and 4b for a converter in accordance with the first preferred embodiment of this disclosure, the converter preferably comprises two conversion modules 200a/b, and each conversion module 200a/b is configured to be corresponsive to one of the positioning slots 110a/b, so that the conversion module 200a/b may be connected by the connecting block 100, but the quantity of conversion modules is not limited in this disclosure. Each conversion module 200a/b includes a printed circuit board 210a/b, at least one first connector 221a/b disposed on the printed circuit board 210a/b and a second connector 222a/b configured to be corresponsive to the first connector 221a/b, and both of the first connector 221a/b and the second connector 222a/b are SAS connectors, and the first connector 221a/b is electrically coupled to the corresponsive second connector 222a/b through the printed circuit board 210a/b. At least a portion of each printed circuit board 210a/b is passed through the opening 111a/b and installed into the corresponsive positioning slot 110a/b, so that the two printed circuit boards 210a/b are configured on a plane. A positioning notched edge 211a/b is formed at an end of each printed circuit board 210a/b, and each positioning notched edge 211a/b is latched to an edge of the corresponsive positioning slot 110a/b, so as to fix the position of the printed circuit board 210a/b on the connecting block 100. In addition, the first connector 221a/b and the corresponsive second connector 222a/b of each printed circuit board 210a/b are disposed on opposite sides of the printed circuit board 210a/b respectively, and the positioning notched edge 211a/b is disposed between the first connector 221a/b and the second connector 222a/b. When the printed circuit board 210a/b is installed to the connecting block 100, the first connector 221a/b and the second connector 222a/b are disposed on both sides of the connecting block 100 respectively.

In FIG. 3, the carrier plate 300 has a through hole 301a formed thereon and configured to be corresponsive to the locking hole 120a, and a mounting structure 310. The mounting structure 310 includes a locking notched edge 311 formed at an edge of the carrier plate 300, a latch 312 formed at an edge of the carrier plate 300, and a port 313a/b configured to be corresponsive to each first connector 221a/b, and each first connector 221a/b is installed into the corresponsive port 313a/b. The connecting block 100 is passed through the through hole 301a and the locking hole 120a and locked to the carrier plate 300 by the screw 10 and a nut. However, the connecting block 100 may be passed through the through hole 301a and then locked to the carrier plate 300 directly by a thread 121 formed in the locking hole 120a and the screw 10. After the connecting block 100 and the carrier plate 300 are secured with each other, the carrier plate 300 covers the opening 111a/b of each positioning slot 110a/b of the connecting block 100 to prevent the printed circuit board 210a/b installed in each positioning slot 110a/b from falling out from the opening 111a/b.

Figure 5:
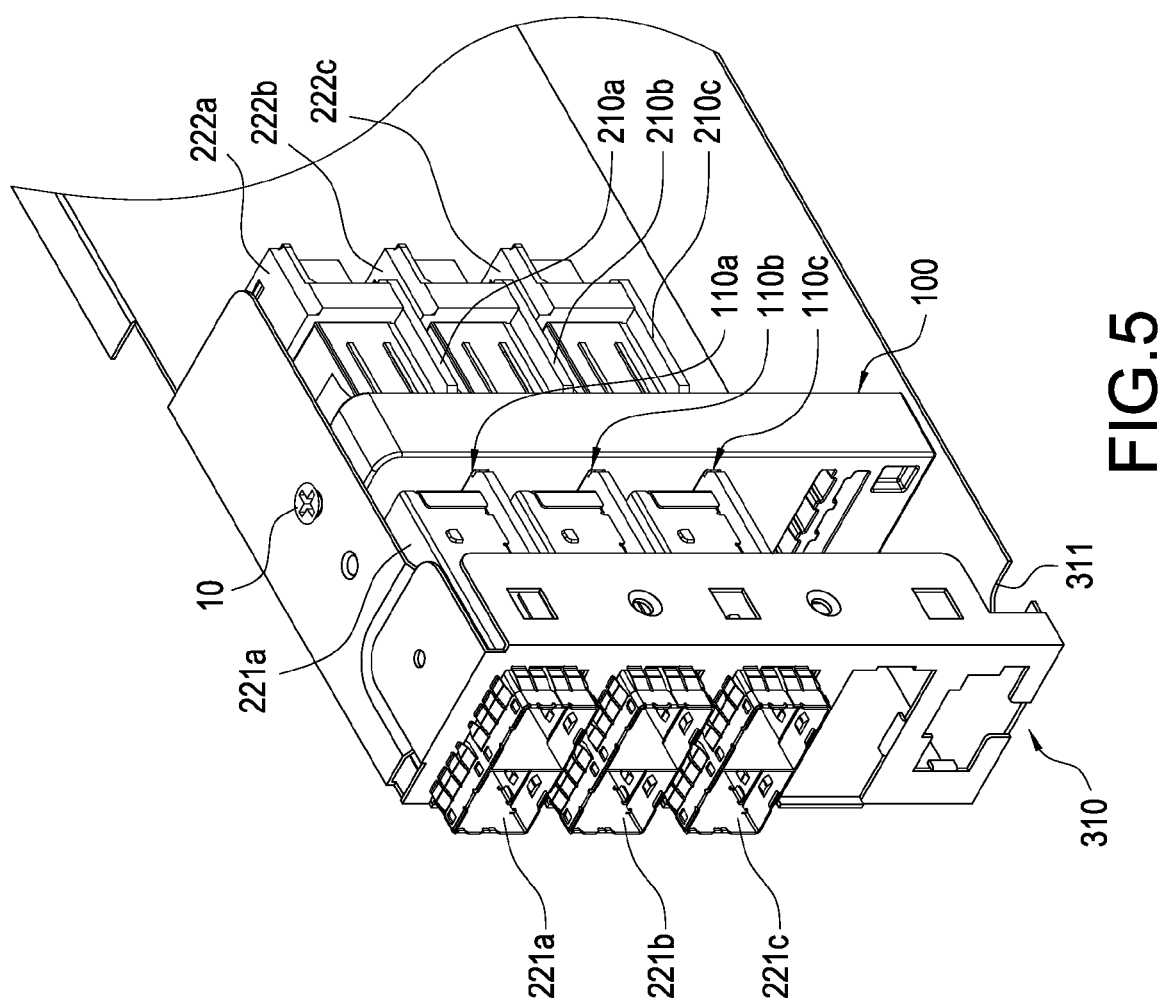
FIG. 5 is a perspective view of a converter of a second preferred embodiment of this disclosure.
Figure 6:
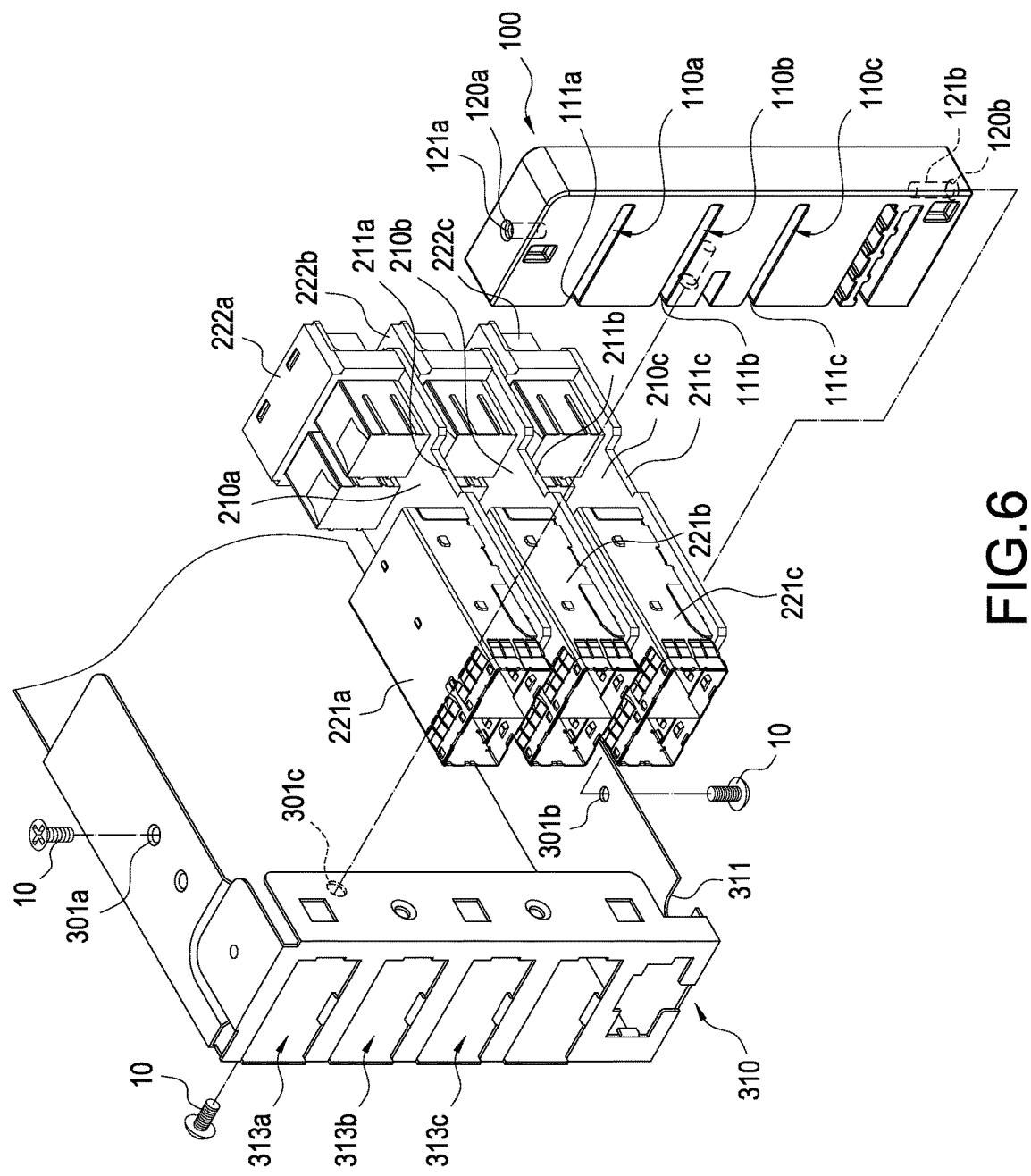
FIG. 6 is an exploded view of a converter of the second preferred embodiment of this disclosure.

With reference to FIGS. 5 and 6 for a converter in accordance with the second preferred embodiment of this disclosure, the converter comprises a connecting block 100, a plurality of conversion modules 200a/b/c, and a carrier plate 300.

In the second preferred embodiment of this disclosure as shown in FIGS. 7a and 7b, the connecting block 100 is preferably a rectangular insulating block and has a plurality of positioning slots 110a/b/c formed on a side of the connecting block 100. In this preferred embodiment, each positioning slot 110a/b/c is preferably configured along the transverse direction of the connecting block 100, and the positioning slots 110a/b/c are arranged parallel to each other and with an interval apart from each other, and each positioning slot 110a/b/c has a rectangular opening 111a/b/c. The connecting block 100 has a plurality of locking holes 120a/b/c formed therein, and the position of the locking hole 120a/b/c is not limited in this disclosure, and a thread 121a/b/c is selectively formed on an inner wall of each locking hole 120a/b/c.

In FIGS. 5 and 6, the converter of the second preferred embodiment of this disclosure preferably comprises three conversion modules 200a/b/c, and each conversion module 200a/b/c is configured to be corresponsive to one of the positioning slots 110a/b/c, so that the conversion modules 200a/b/c can be connected by the connecting block 100, but the quantity of the conversion modules is not limited in this disclosure. Each conversion module 200a/b/c includes a printed circuit board 210a/b/c, at least one first connector 221a/b/c installed on the printed circuit board 210a/b/c, and a second connector 222a/b/c configured to be corresponsive to the first connector 221a/b/c, and both first connector 221a/b/c and second connector 222a/b/c are of the mini SAS HD specification, and the first connector 221a/b/c is electrically coupled to the corresponsive second connector 222a/b/c through the printed circuit board 210a/b/c. At least a portion of the printed circuit board 210a/b/c is passed through the opening 111a/b/c and installed into the positioning slot 110a/b/c, so that the printed circuit boards 210a/b/c are configured on a plane. A positioning notched edge 211a/b/c is formed at an edge of each printed circuit board 210a/b/c, and each positioning notched edge 211a/b/c is latched to an edge of the corresponsive positioning slot 110a/b/c to fix the position of the printed circuit board 210a/b/c on the connecting block 100. In addition, the first connector 221a/b/c and the corresponsive second connector 222a/b/c disposed on each printed circuit board 210a/b/c are disposed on both sides of the printed circuit board 210a/b/c respectively, and the positioning notched edge 211a/b/c is disposed between the first connector 221a/b/c and the second connector 222a/b/c. When the printed circuit board 210a/b/c is installed to the connecting block 100, the first connector 221a/b/c and the second connector 222a/b/c are configured on both sides of the connecting block 100 respectively.

In FIGS. 5 and 6, the carrier plate 300 has a plurality of through holes 301a/b/c configured to be corresponsive to each locking hole 120a/b/c, and a mounting structure 310. The mounting structure 310 includes a locking notched edge 311 formed at an edge of the carrier plate 300 and a port 313a/b/c configured to be corresponsive to the first connector 221a/b/c, and the first connector 221a/b/c is passed and installed into the port 313a/b/c. The connecting block 100 may be passed through the through hole 301a/b/c and the locking hole 120a/b/c and locked to the carrier plate 300 by the screw 10 and a nut. However, the connecting block 100 may also be locked to the carrier plate 300 by passing the screw 10 through the through hole 301a/b/c and directly locking the screw 10 to a thread 121a/b/c formed in the locking hole 120a/b/c. After the connecting block 100 and the carrier plate 300 are locked with each other, the carrier plate 300 covers the opening 111a/b/c of each positioning slot 110a/b/c of the connecting block 100 to prevent the printed circuit board 210a/b/c installed in each positioning slot 110a/b/c from falling out from the opening 111a/b/c.

Figure 8:
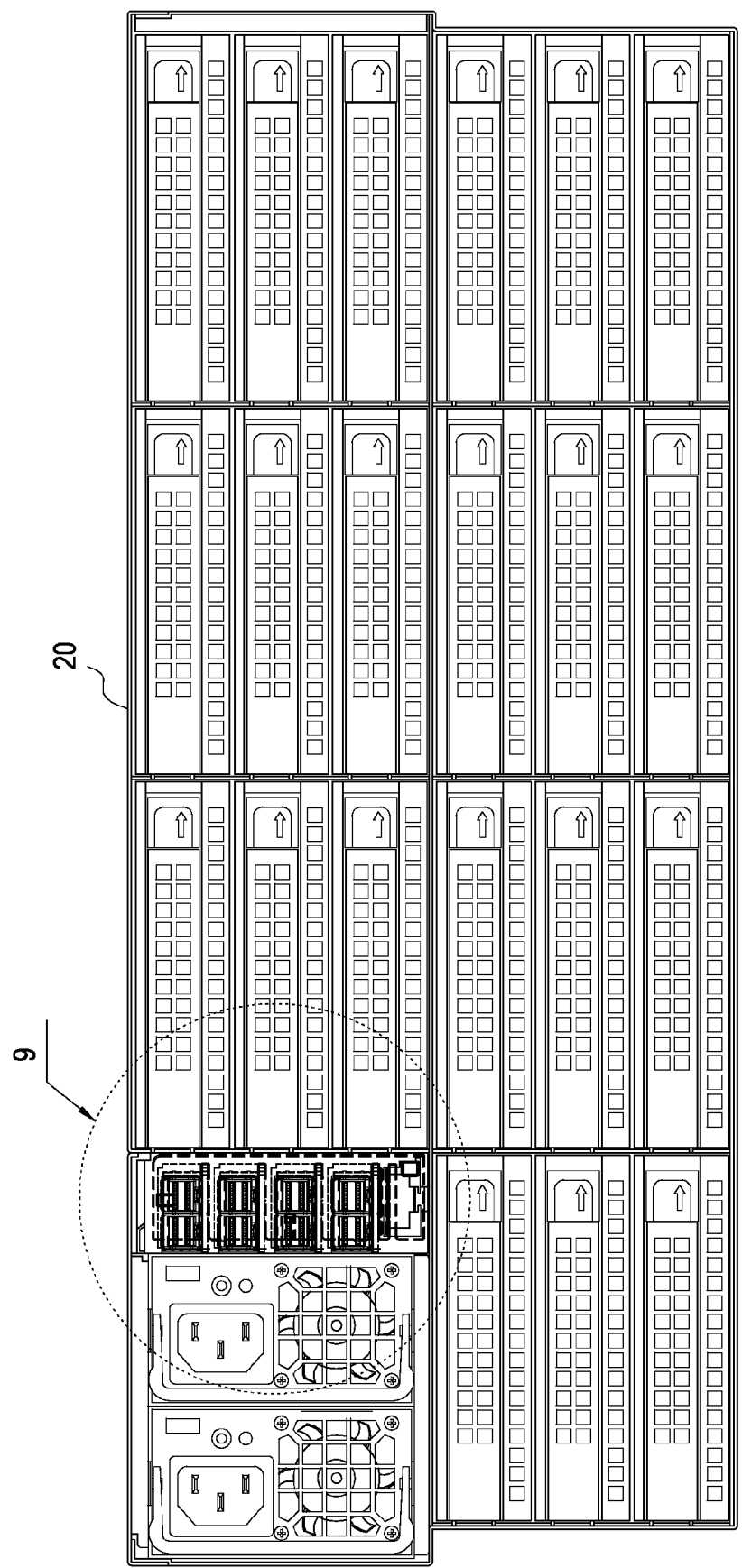
FIG. 8 is a schematic view of installing a converter of this disclosure.
Figure 9:
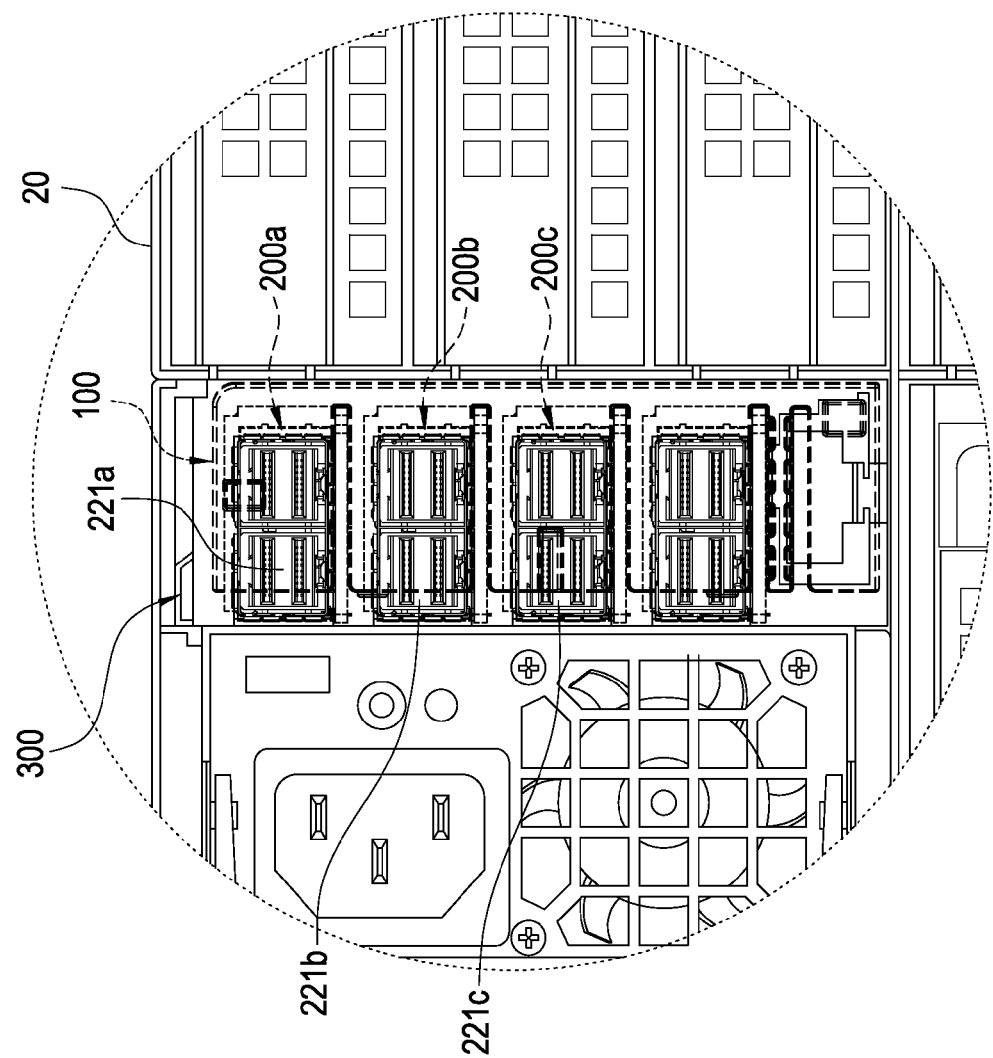
FIG. 9 is another schematic view of installing a converter of this disclosure.

With reference to FIGS. 8 and 9, the converter of this disclosure is fixed and installed into the chassis 20 of a server host, the mounting structure 310 at locking notched edge 311 (as shown in FIGS. 1, 2 and 5) is provided for locking the chassis 20, and the latch 312 (as shown in FIGS. 1 and 2) disposed on the mounting structure 310 is provided for latching the chassis 20. The first connector 221a/b/c is exposed from the chassis 20, and the second connector 222a/b/c is contained in the chassis 20, such that the data transmitted by the electronic components inside and outside the chassis 20 can be converted. The converter of this disclosure is coupled to a plurality of conversion modules 200a/b/c by the connecting block 100, and then the conversion modules 200a/b/c are installed to the chassis 20. Therefore, each conversion module does not require the installation of an additional connecting mechanism, and the total volume of the converter can be reduced.

While this disclosure has been described by means of specific embodiments, numerous modifications and variations could be made thereto by those skilled in the art without departing from the scope and spirit of this disclosure set forth in the claims.

What is claimed is:

1. A converter, comprising:
   a connecting block (100), having a plurality of positioning slots (110) formed thereon;
   a plurality of conversion modules (200) configured to be corresponsive to the positioning slots (110) respectively, and each conversion module (200) further including a printed circuit board (210), a positioning notched edge (211) formed at an edge of each of the printed circuit boards (210), and at least a portion of the printed circuit board (210) being contained in the corresponsive positioning slot (110), and each of the positioning notched edges (211) being latched to an edge of the corresponsive positioning slot (110), and each of the printed circuit boards (210) having a first connector (221) and a second connector (222) electrically coupled to the first connector (221), and both of the first connector (221) and the second connector (222) being configured on both sides of the connecting block (100) respectively; and
   a carrier plate (300), and each of the positioning slots (110) having an opening (111), and each of the printed circuit boards (210) being installed into the corresponsive positioning slot (110) through the corresponsive opening (111), and the connecting block (100) being locked to the carrier plate (300), and the carrier plate (300) covering each opening (111), so that the printed circuit boards (210) are clamped between the connecting block (100) and the carrier plate (300).

2. The converter according to claim 1, wherein the carrier plate (300) has a mounting structure (310) formed thereon, and the mounting structure (310) includes a locking notched edge (311) formed at an edge of the carrier plate (300).

3. The converter according to claim 2, wherein the mounting structure (310) includes a latch (312) formed at another edge of the carrier plate (300).

4. The converter according to claim 1, wherein the connecting block (100) has a locking hole (120) formed thereon, and the carrier plate (300) has a through hole (301) corresponsive to the locking hole (120).

5. The converter according to claim 4, wherein the locking hole (120) includes a thread (121) formed therein.

6. The converter according to claim 1, wherein the carrier plate (300) has a mounting structure (310) formed thereon, and the mounting structure (310) includes a port (313) corresponsive to the first connector (221), and the first connector (221) is passed and installed into the port (313).

7. The converter according to claim 1, wherein the positioning notched edge (211) is disposed between the first connector (221) and the second connector (222).

8. The converter according to claim 1, wherein the printed circuit boards (210) are installed on a same plane.

9. The converter according to claim 1, wherein the printed circuit boards (210) are parallel to each other and stacked with an interval apart from each other.

* * * * *